(No Model.)
E. E. ROWE.
FIFTH WHEEL FOR VEHICLES.
No. 321,641. Patented July 7, 1885.
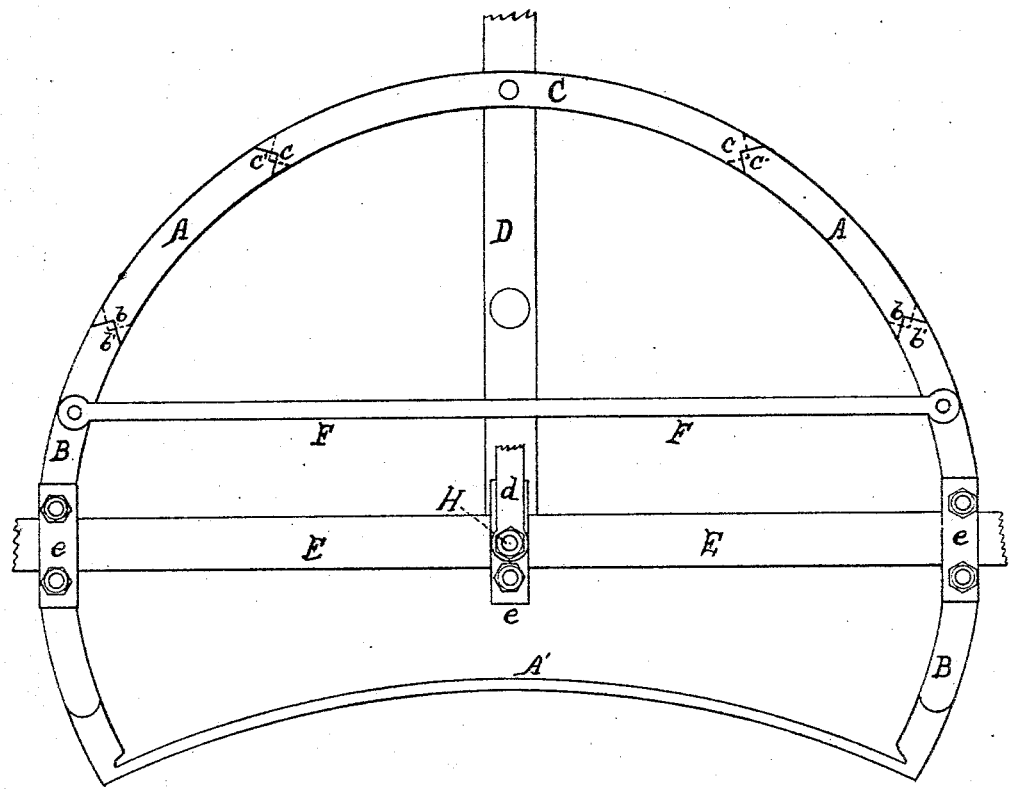
Witnesses:
Harry D. Stewart
W H Harlow
Inventor:
Elmer E. Rowe
By J. R. Means Atty

United States Patent Office.

ELMER E. ROWE, OF ELLSWORTH, MAINE, ASSIGNOR TO ROWE BROTHERS, OF SAME PLACE.

FIFTH-WHEEL FOR VEHICLES.

SPECIFICATION forming part of Letters Patent No. 321,641, dated July 7, 1885.

Application filed April 15, 1885. (No model.) Patented in Canada March 27, 1885, No. 21,324.

*To all whom it may concern:*

Be it known that I, ELMER E. ROWE, a citizen of the United States, residing at Ellsworth, in the county of Hancock and State of Maine, have invented a new and useful Fifth-Wheel for Vehicles; and I do hereby declare that the following is a full, clear, and exact description of the invention, which will enable others skilled in the art to which it appertains to make and use the same, reference being made to the accompanying drawing, which shows a bottom view.

The object of my invention is to regulate the movement of the forward axle of the vehicle on the king-bolt, and so to control it as to prevent the forward wheels being brought in contact with or cramped against the chafe-iron or body of the vehicle when the vehicle is being turned, and from running under and lifting the body of the vehicle, as occasionally happens on a sudden and violent turn.

Fifth-wheels are usually constructed with a ring of metal flattened on the bottom and attached to the rocker-bar or top works of the vehicle. The flattened bottom of the ring bears upon two short segments of a similar ring of the same curve flattened upon their tops and attached to the forward axle of the vehicle by clasps. These segments are made of sufficient length only to afford a steady bearing for the upper ring, and prevent the axle from tipping, and generally extend only a few inches before and behind the axle. The bottom of the upper ring, being perfectly flat and smooth, permits a free revolution of the lower ring or segments until the wheel of the vehicle comes in contact with the body of the carriage or with the chafe-iron, where the wheel sometimes cramps, and often running under the body of the vehicle, lifts or overturns it. To prevent this result, I form upon or attach to the bottom of the back side of the upper ring, A, a stop or check, C, consisting of a flat strip of metal bent to the curve of the ring A, and extending on the ring to such a distance on each side of the center bar, D, of the vehicle that, as the forward axle E turns on the king-bolt H, the back end of one of the segments B B of the lower ring shall reach and abut against the adjacent end c of the stop C before the wheel touches the chafe-rim or the body of the vehicle.

The stop C may be made integral with the upper ring, A, or separate, or attached to it by screws, bolts, or in any suitable manner.

In order to prevent any possibility of the ends b b of the segments B B of the lower ring riding over or slipping by the adjacent ends c c of the stop C, I sometimes form the ends of the stop C thicker than the ends b b of the segments B B, and I level off both sides of the ends b b of the segments, thus bringing the ends to a point, and I form the ends c c of the stop C with re-entrant angular notches to receive the beveled ends b b of the segments B B; or this form of the ends of the stop and segments may be reversed, and both sides of the ends c c of the stop C, instead of being formed with the notches at c c, may be made angular, as shown by the dotted lines at c' c', and the ends b b of the segments B B may be formed with the re-entrant angular notches, as shown by the dotted lines at b' b'.

By my device the revolution of the forward axle on the king-bolt is checked before either of the fore wheels in their oblique backward swing can touch the chafe-irons or any part of the vehicle.

The use of chafe-irons becomes unnecessary, and the wheels cannot become cramped or run under and lift the body of the vehicle.

I do not claim, broadly, a stop or check for fifth-wheels; but

What I claim as my invention, and desire to secure by Letters Patent, is—

The herein-described fifth-wheel for vehicles, consisting of the upper ring, A, having the stop C, formed as shown, in combination with the segments B B of the lower ring formed with the angularly-pointed ends b b or re-entrant angular notches b' b', adapted to fit into or receive the corresponding re-entrant angular notches c c, or angularly-pointed ends c' c' of the stop C, all as shown and described, and substantially as and for the purpose specified.

April 7, 1885.

ELMER E. ROWE.

Witnesses:
GEO. P. DUTTON,
A. W. GREELY.